April 2, 1957 — W. H. NEIDT — 2,787,265
SAW ATTACHMENT FOR DRILL
Filed Aug. 16, 1954
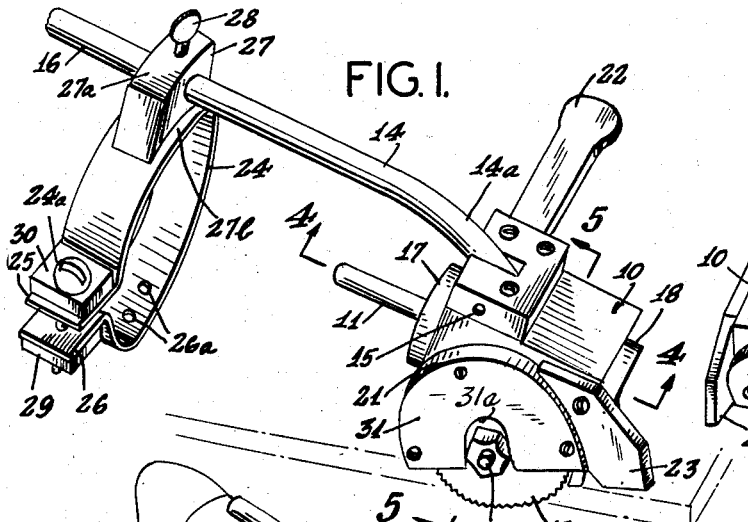
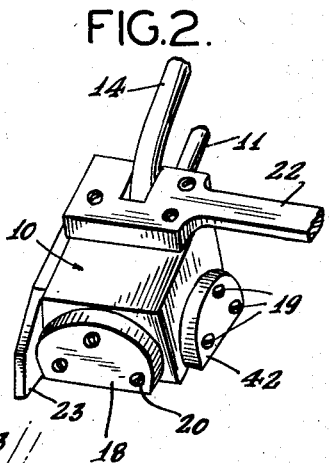
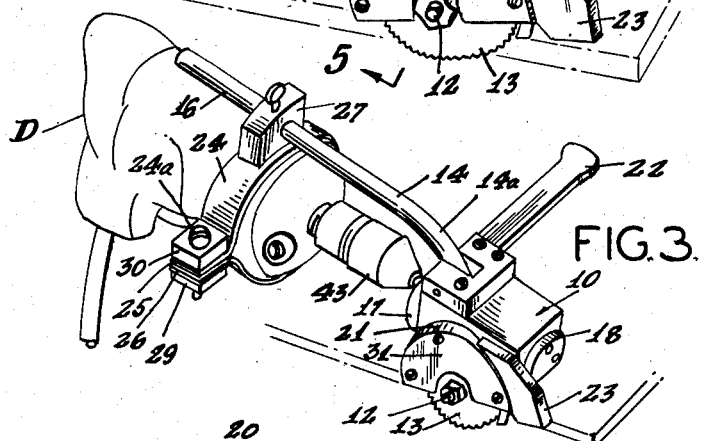
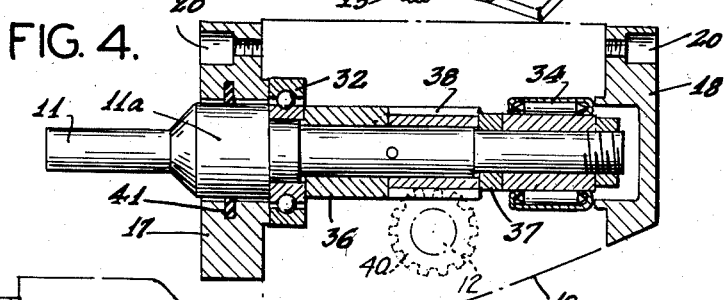
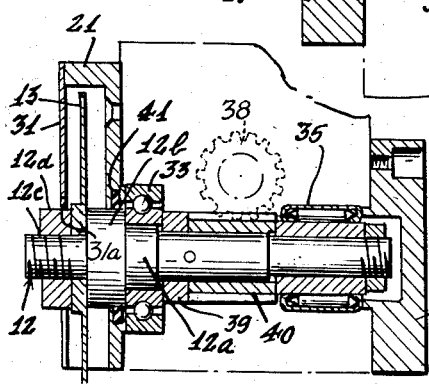
INVENTOR.
WARREN H. NEIDT
BY
ATTORNEY.

United States Patent Office 2,787,265
Patented Apr. 2, 1957

2,787,265
SAW ATTACHMENT FOR DRILL

Warren H. Neidt, Torrington, Conn.

Application August 16, 1954, Serial No. 450,144

1 Claim. (Cl. 143—43)

This invention relates to sawing devices and more particularly to a saw attachment for an electrically driven drill.

One object of the present invention is to provide a mechanism for driving a circular saw from the chuck of an electric drill.

A further object is to provide an attachment of the above nature which is adapted to fit drills of various sizes, and which may be easily manipulated and guided in its operation.

A further object is to provide a device of the above nature in which the saw will be driven by means of interconnected tool steel shafts and helical gears, and in which the mechanism will be encased permanently in grease so that it will require no further lubrication.

A further object is to provide a device of the above nature in which the saw will be protected by a guard and will be provided with a clear vision straight edge guide.

A further object is to provide a mechanism of the above nature having a rocker bottom to permit it to have uniform contact with the work.

A still further object is to provide a device of the above nature which will be simple in construction, inexpensive to manufacture, easy to install and manipulate, compact, ornamental in appearance, and very efficient and durable in use. With these and other objects in view, there has been illustrated on the accompanying drawing, one form in which the invention may conveniently be embodied in practice.

In the drawing,

Fig. 1 represents a perspective view of the saw driving attachment shown in detached position from the drill, with the saw in operating position—the work being shown in dotted lines.

Fig. 2 is an end perspective view of the same.

Fig. 3 is a side perspective view on a smaller scale, showing the attachment as it appears when connected to an electric drill shown in phantom.

Fig. 4 is a longitudinal section, taken along the line 4—4 of Fig. 1, looking in the direction of the arrows.

Fig. 5 is a cross-sectional view taken along the line 5—5 of Fig. 1.

The purpose of the drill attachment of this invention is to provide a thin, circular saw of high speed steel, which will cut through combination metal, plywood, and porcelain boards without ripping the metal sides, as was previously the case with standard saws.

In use, the thickness of the cut will be determined by the engagement of the saw guide with the edge of the board to be cut.

Referring now to the drawing, in which like reference numerals denote corresponding parts throughout the several views, the numeral 10 indicates a substantially rectangular body having a curved rearwardly and upwardly inclined base 10a to permit the block to have uniform rockable contact with the work.

Provision is also made of a longitudinal drive shaft 11 having an enlarged hub 11a located within a bearing cap 17. The other end of the drive shaft 11 is mounted to rotate within a bearing cap 18. The caps 17 and 18 are secured to the front and rear ends of the body 10 by headed attaching screws 19, located in screw holes 20.

Provision is also made of a transverse saw shaft 12 having hubs 12a, 12b, integral therewith, and provided with a threaded end 12c, upon which a nut 12d is screwed.

In order to secure the body 10 of the saw attachment to a drill D, provision is made of an elongated support rod 14 having a straight rear end 16 and a curved front end 14a, said end 16 being adapted to be received within a block 27, as hereinafter described. The other end of the rod 14 is provided with a small pivot pin 15 mounted within the body 10.

The circular saw 13 is protected by a cover ring 21, and an end cover plate 31, having a shaft recess 31a.

In order to manipulate the attachment during use, provision is made of a side handle 22 having flat upper and lower surfaces and parallel sides. A saw guide 23 is also attached to the saw side of the block 10.

The block 27 is secured to the rod 14 by means of a set screw 28, and said block is also secured, as by screws, to a circular strap 24 having parallel flat ends 25, 26, bent at an angle thereto. The strap 24 is also provided with a series of holes 26a to facilitate the adjustment thereof upon the particular drill. The screw 24a will be inserted into the proper hole 26a according to the size of the drill body.

The block 27 is provided with curved upper and lower surfaces 27a and 27b, as clearly shown in Fig. 1 of the drawing. In order to adjust the strap 24 upon the drill D, provision is made of a nut 29 located below the end 26, and a washer 30 located above the end 25. The drive shaft 11 and the saw shaft 12 are provided with ball bearings 32 and 33 respectively, and needle bearings 34, 35, respectively, as clearly shown in Figs. 4, 5.

Provision is also made of spacers 36, 37 on the drive shaft 11, and a spacer 39 on the saw shaft 12. The shafts 11 and 12 are also provided with intermeshing helical gears 38 and 40. Felt seals 41, are also provided on the ends of the shafts 11 and 12 to prevent access of dirt. The opposite rear end of the saw shaft is covered by a side thrust plate 42.

Operation

In operation, the attachment will be mounted upon the drill D by means of the adjustable strap 24, which may be bent in accordance with the shape of the drill, and the set screw 28 will then be tightened upon the rod 14. The support rod 14 will then be bent at its curved end 14a, so that the drive shaft 11 will be aligned with the chuck 43, thereby eliminating strain on the unit and avoiding loss of power while being used.

One advantage of the present invention is that the entire unit is packed in lifetime grease and the bottom of the body will be rounded to allow rockable movement of the unit up and down to maintain the proper contact with the material being cut.

A further advantage is that the saw guide acts as a straight edge to start the cut in line with the inside edge of the saw.

A still further advantage is that the saw attachment unit will easily cut wood, metal and covered wood, plastic and other soft material up to 5/16 of an inch in thickness. It will also cut thin metals up to 1/16 of an inch in thickness.

Where there has been disclosed in this specification, one form in which the invention may be embodied, it is to be understood that this form is shown for the purpose of illustration only and that the invention is not limited to the specific disclosure, but may be modified and embodied in various other equivalent forms without departing from its spirit.

In short, the invention includes all the modifications and embodiments coming within the scope of the following claim.

Having thus fully described the invention, what is claimed as new and for which it is desired to secure Letters Patent is:

In a saw attachment for a motor operated drill, a body having a drive shaft to be detachably received by the chuck of an electric drill, said body holding a transverse shaft for a circular saw operatively connected by gearing to said drive shaft, a mounting block provided with a strap to embrace the housing of said drill, an elongated support rod slidably connected at one end to said mounting block, said rod being located above said housing and having a pivoted connection with said body at its other end by means of a transverse horizontal pin, whereby lengthwise adjustment of said support with respect to said body will be permitted, said body having no direct support upon the work or table, and a saw guide plate attached to said body in advance of the forward edge of said saw and coplanar therewith, said guide plate being disposed with its lower edge bearing downwardly upon the work to be sawed.

References Cited in the file of this patent

UNITED STATES PATENTS

| | | |
|---|---|---|
| 1,806,582 | Beutner | May 26, 1931 |
| 1,850,137 | Pursell | Mar. 22, 1932 |
| 2,282,728 | Kern | May 12, 1942 |
| 2,519,526 | Wilber | Aug. 22, 1950 |
| 2,544,461 | Leitzel | Mar. 6, 1951 |
| 2,649,871 | Desbarat | Aug. 25, 1953 |
| 2,662,562 | Lindell | Dec. 15, 1953 |

FOREIGN PATENTS

| | | |
|---|---|---|
| 678,247 | Great Britain | Aug. 27, 1952 |